May 16, 1939. R. R. LAWSON ET AL 2,158,725
APPARATUS AND METHOD FOR TESTING HAIRSPRINGS AND LIKE DEVICES
Filed July 29, 1937
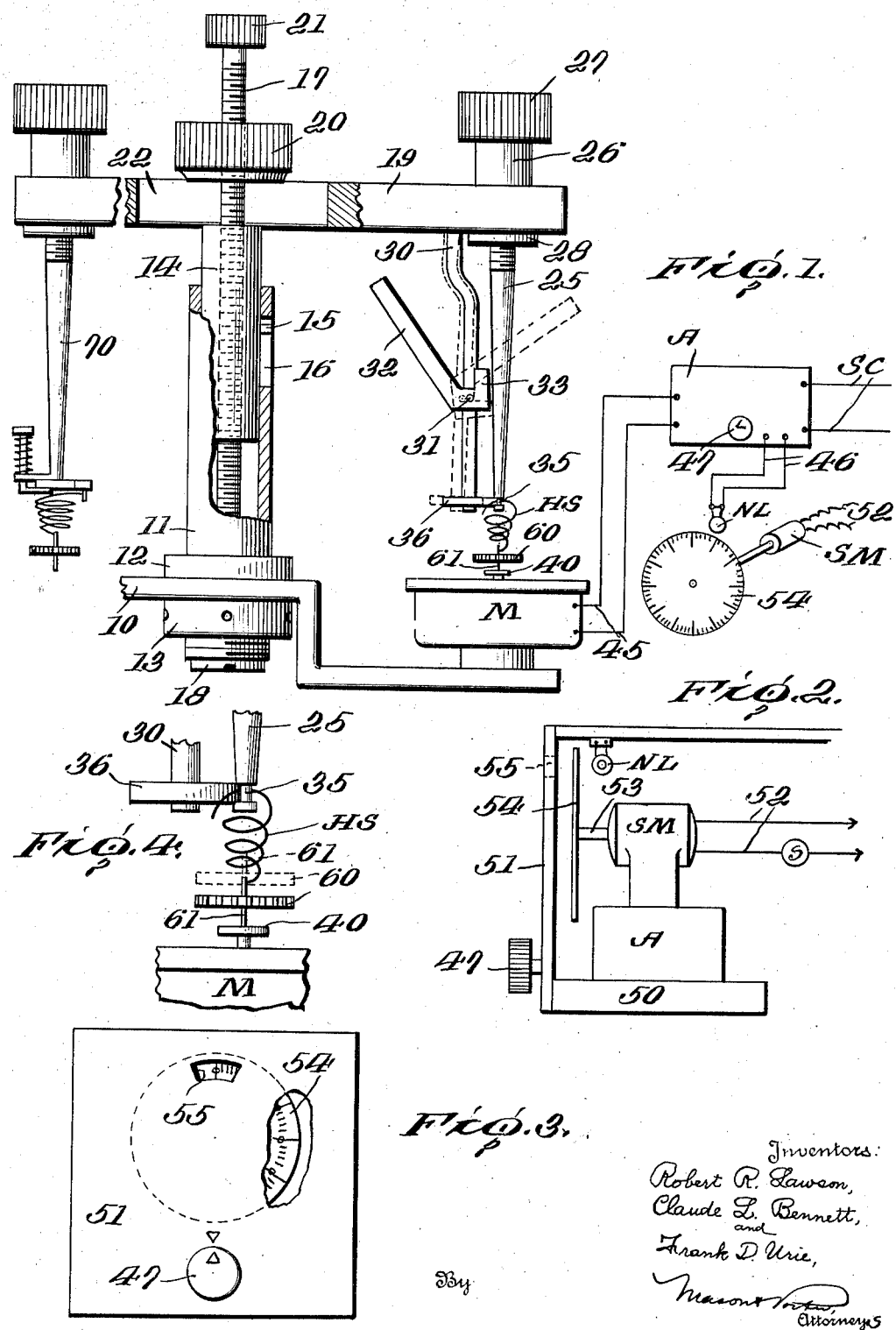

Patented May 16, 1939

2,158,725

UNITED STATES PATENT OFFICE 2,158,725

APPARATUS AND METHOD FOR TESTING HAIRSPRINGS AND LIKE DEVICES

Robert R. Lawson, Claude L. Bennett, and Frank D. Urie, Elgin, Ill., assignors to Elgin National Watch Company, Elgin, Ill., a corporation of Illinois Application July 29, 1937, Serial No. 156,414

9 Claims. (Cl. 73—51)

It has heretofore been proposed to test various timing devices, such as hairsprings, in various ways to determine whether such are constructed and adjusted to synchronism, that is, whether they are capable of operating at a predetermined rate.

The present invention is concerned with a method and apparatus for testing such devices, and is more particularly concerned with accomplishing such tests quickly and accurately.

One of the features of the present invention is the provision of means for supporting a hairspring or like device, and deriving therefrom impulses of electric current indicative of the rate at which the device is operated, and then comparing the impulses from the tested device with standard impulses, to determine the direction and degree of departure of the tested movement from isosynchronism with the standard impulses.

Another feature of the present invention is the provision of an apparatus for supporting a hairspring or like spring device at a point corresponding to its point of attachment during normal operation, and establishing a movement of parts of the hairspring in a direction substantially parallel to its axis, and employing such axial movements for deriving current impulses representative of the rate of the tested spring.

A further feature of the present invention comprises the method of testing hairsprings and like devices, by employing axial movement thereof in association with a structure which is normally actuated by the spring, for deriving an indication of the rate of these associated parts.

Other features of the invention reside in the combinations of parts and in the steps of procedure, and will appear more closely in the course of the following specification and claims.

An illustrative form of apparatus according to this invention and for practicing the method thereof, appears in the accompanying drawing, in which:

Figure 1 is a side elevation, with parts broken away, showing supporting structure for a watch hairspring in association with a microphone, and with circuit elements conventionally shown in association therewith.

Figure 2 is a side elevation of an indicator and amplifier assembly, with a side plate removed.

Figure 3 is a front elevation of the parts shown in Fig. 2.

Figure 4 is a diagrammatic view illustrating the axial movement of a hairspring and balance wheel assembly during the course of the rotative torsional movements of the assembly.

In the drawing, a base 10 has an aperture for receiving a standard 11 which is threaded at its lower end for receiving the two nuts 12, 13 for clamping it in a fixed upright position. The standard 11 is hollow, and receives a sliding stem 14. This stem may be provided with a pin 15 which extends into a slot 16 of the wall of the standard 11, to prevent relative rotative movement of the standard 11 and the stem 14. The stem 14 has a threaded internal bore to receive the screw 17 which abuts at its lower end against a plug 18 at the bottom of the standard 11, and passes upward through a beam 19 and a locking nut 20, and has a milled or knurled knob 21 at its upper end so that the screw 17 may be rotated as desired. The beam 19 has a slot 22, so that the beam may be moved in a plane at right angles to the axis of the screw 17. At one end, the beam 19 has an aperture for receiving a threaded supporting rod 25 having an enlarged collar 26 and a threaded or knurled knob 27 at its end above the beam 19. A nut 28 serves to secure these parts in position upon the beam, while permitting rotation of the rod 25 about its axis.

A spring arm 30 is supported by the beam 19 and extends downwardly therefrom. It is provided with a pivot 31 for a throw-off lever 32 having a camlike portion 33 which cooperates with the downwardly extending portion of the rod 25 for causing the spring arm 30 to be moved away from the rod 25, or to permit it to move closer thereto by its own resiliency.

The lower end of the rod 25 is provided with a groove forming a roller 35 and having below it a portion of larger diameter, as shown on a larger scale in Fig. 4. The lower end of the spring arm 30 is provided with a revoluble roller 36 which advantageously is of larger diameter than the roller 35, and is of a thickness such that it enters the groove provided at this roller 35, in order that the two rollers 35, 36 may pinch a hairspring HS therebetween for supporting the same.

The base 10 also supports a microphone M which is illustrated as having a small projecting table 40 secured to the diaphragm or like structure of the microphone, and which upon its movement causes a variation in the electrical resistance of the microphone, or by other known means causes the microphone to vary in its effect upon currents flowing through the conductors 45. These conductors lead to an amplifier A which is conventionally shown in Fig. 1 as being controlled by an input current on conductors 45, and as delivering current impulses through the output conductors 46. A gain control 47 permits varying the amplitude of response in the output conductors 46, and the amplifier is supplied with current by the supply conductor SC. This amplifier is shown conventionally, and any desired type thereof may be employed, the particular construction forming no part of the present invention.

The current flowing in the output conductors 46 comprises impulses which are determined in their rate by the action of the microphone M, and are employed to cause flashing of a lamp NL which appropriately may be of the neon type.

In Figs. 2 and 3, the indicating structure is shown as having a base 50 upon which may be supported the parts of the amplifier A. A front panel 51 may have the gain control 47 accessible thereat. Behind this front panel 51 is mounted a motor SM which is driven at a standard rate by the action of an electric current of standard frequency flowing through the standard frequency conductors 52.

The motor SM by suitable means (illustrated as a simple shaft 53) turns an indicator disk 54 at a uniform standard rate of speed such as one revolution per second. This disk 54 (Fig. 3) rotates opposite a window 55 in the front panel 51, and has upon its face, to be visible through the window 55, graduations corresponding to the beat rate or rates of a fully adjusted watch: that is, it may have one or more sets of graduations if different types of hairsprings of different periods are to be tested. This dial is preferably transparent, save for the graduations thereon. From Fig. 2, it will be seen that the neon lamp NL is located adjacent the dial 54 and opposite the window 55, so that each flash of the neon bulb will permit viewing an instantaneous position of the dial. Hence, if the impulses delivered by the output conductors 46 are at the identical spacing with the rate of rotation of the dial disk 54, divided by the number of watch movement beats per unit revolution, then the successive flashes will cause an index line to appear, at each flash, at an invariable position opposite the window 55. On the other hand, if the movement is "fast" or "slow", the index line will appear to drift to right or left; and for a standard time interval of testing, the amount of this drift will be an indication of the degree of "off rate" of the particular movement.

In Fig. 4, the hairspring HS is shown in two positions. Preliminary to test, it will be understood, the hairspring is staked in the usual manner to a balance comprising the balance wheel 60 and the balance staff 61.

In normal operation, according to the present invention, for determining the proper length of the hairspring HS, the assembly shown in Fig. 4 is set in rotation by a tangential airblast on the balance wheel 60, so that this wheel is set in rotative oscillation. As it moves in the winding direction of the hairspring HS, the torsion effects in this spring cause it to wind up and to become shorter in the vertical dimension, so that it lifts the balance against the action of gravity, while a movement of the balance wheel in the opposite direction causes the hairspring to pass to a condition of greater relaxation, so that the balance moves downward below the position of rest. Thus, by the interaction of torsional effects in the spring and the influence of gravity, the hairspring produces an axial movement of the balance, without influence upon the rate of vibration of this assembly. It will be noted that while the normal hairspring is a plane spiral, it assumes the position of a varying spiral in space under the conditions of the present test.

This axial movement is employed by adjustment of the vertical position of the rollers 35, 36 at their point of engagement with the hairspring, so that the lower end of the balance staff taps upon a table 40 as the balance bobs up and down in its vibration. Hence, the microphone M responds with a current pulse each time that the tapping occurs, and these impulses are repeated by the amplifier A to the output conductors 46, and the neon lamp NL is caused to flash.

The hairspring may be inserted and removed by actuating the throw-off lever 32 to separate the roller 36 from the roller 35 for removing the spring. The new hairspring may be engaged in the groove provided by roller 35, and the throw-off lever 32 released to permit roller 36 to engage the new spring.

The vertical position of the hairspring and balance assembly, with respect to the table 40, may be adjusted by slightly releasing the nut 20 and rotating the knob 21, so that the sleeve 14 is caused to travel up or down the desired distance, whereupon the nut 20 is tightened again. The position of the staff with respect to the microphone table 40 may also be adjusted by swinging the beam 19 about the axis of the screw 17 and sliding it in the radial plane of the screw 17 as desired, while the nut 20 is released.

If it is desired to adjust the hairspring accurately to a standard time, this may be accomplished by rotating the knob 27 so that the rod 25 is turned, and therewith the roller 35. The roller thus causes the upper or larger diameter end of the hairspring to be moved between itself and the roller 36, thus increasing or decreasing the effective length of the hairspring.

Thus, it is possible to use the apparatus and method for substantially calibrating a plurality of hairsprings to correct timing. These hairsprings may then be bent about the smaller diameter of the roller 35 to indicate the point at which they should be connected to the balance cock or hairspring stud when assembled in a watch.

In Fig. 1, at the left-hand end of the beam 19, is shown a support 70 providing a holder for a balance cock or hairspring stud. By releasing the nut 20 and swinging the beam 19 about the axis of the screw 17 until it is above the microphone table 40, an assembly of a balance, a hairspring, and a balance cock or hairspring stud may be secured therein and the rate of this assembly determined; and then necessary adjustment of the assembly accomplished by employing the normal balance screws for determining the inertia effect of the balance wheel, employing the axial movement as before for producing current impulses from the microphone M.

It is obvious that the invention is not limited to the apparatus or method described, but that these may be varied in many ways within the scope of the appended claims.

We claim:

1. The method of testing hairsprings and like devices which comprises securing the device adjacent one end and applying a yielding axial force adjacent the other end, torsionally vibrating the device whereby torsional and axial movements occur, and detecting the rate of such axial movements.

2. The method of testing spiral hairspringand-balance assemblies and like devices, which comprises securing the free end of the hairspring to a support while permitting the balance to hang suspended by the hairspring, torsionally vibrating the balance, and detecting the rate of axial movement of the assembly.

3. An apparatus for testing hairsprings and like devices, comprising a support, means for raising and lowering said support, means on the support for clamping an end of a hairspring, means for exerting yielding axial force upon the other end of the hairspring, a device responsive to pressure thereon for controlling an electric current, the hairspring when in torsional vibration being effective to exert a varying pressure upon said device in synchronism with its own vibrating movements, and means including a circuit through said device for comparing the rate of variations in said current with standard time intervals.

4. An apparatus for testing hairspring-and-balance assemblies and like devices, comprising means for clamping the free end of the hairspring and permitting the balance to be suspended from the hairspring, said hairspring when in torsional vibration being effective to raise and lower the balance, and means responsive to the vertical movements of the balance for detecting the rate of vibration of the assembly.

5. An apparatus for producing a succession of timed electrical impulses, comprising means for clamping a hairspring-and-balance assembly by the free end of the hairspring and permitting the balance to be suspended from the hairspring, said hairspring when in torsional vibration being effective to raise and lower the balance, and means responsive to the vertical movements of the balance for emitting a succession of electrical impulses synchronous therewith.

6. An apparatus as in claim 5, in which said responsive means includes a microphone located below the assembly and in which the bobbing movement of the balance causes it to tap the microphone at the lowermost point of each such bobbing movement.

7. An apparatus as in claim 5, in which said responsive means includes a microphone located below the assembly and in which the bobbing movement of the balance causes it to tap the microphone at the lowermost point of each such bobbing movement, and including means for varying the distance between said clamping means and microphone.

8. An apparatus for testing hairsprings and like devices, comprising a base, a microphone on said base, a column on said base, a beam, means for varying the height of the column and means for clamping said beam thereto, and a hairspring-supporting device on said beam, said hairspring being supported thereby so that in vibrating it performs axial movements for actuating the microphone.

9. An apparatus as in claim 8, in which the device comprises a pair of rollers, means for holding the same resiliently engaged with the hairspring, and means for rotating at least one of the rollers.

ROBERT R. LAWSON.
CLAUDE L. BENNETT.
FRANK D. URIE.